United States Patent
Omachi et al.

(10) Patent No.: US 10,304,215 B2
(45) Date of Patent: May 28, 2019

(54) PROVIDING VARIANTS OF TEXTURE ASSETS FOR AN ASSET CATALOG

(71) Applicant: Apple Inc., Cupertino, CA (US)

(72) Inventors: Daniel I. Omachi, Sunnyvale, CA (US); Patrick O. Heynen, Redwood City, CA (US); Eric O. Sunalp, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 33 days.

(21) Appl. No.: 15/179,969

(22) Filed: Jun. 10, 2016

(65) Prior Publication Data

US 2017/0358110 A1    Dec. 14, 2017

(51) Int. Cl.
*G06F 8/60* (2018.01)
*G06T 11/00* (2006.01)
*G06T 15/04* (2011.01)

(52) U.S. Cl.
CPC .............. *G06T 11/001* (2013.01); *G06F 8/60* (2013.01); *G06T 15/04* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 6,353,448 B1 * | 3/2002 | Scarborough | G06F 17/30899 707/E17.119 |
| 7,765,539 B1 | 7/2010 | Elliot et al. | |
| 7,966,428 B2 | 6/2011 | Jalon | |
| 8,356,117 B2 | 1/2013 | Jalon | |
| 8,468,498 B2 | 6/2013 | Lee et al. | |
| 8,713,558 B2 | 4/2014 | Vida et al. | |
| 8,863,077 B2 | 10/2014 | Lee et al. | |
| 9,009,696 B2 | 4/2015 | Vidal et al. | |
| 9,072,972 B2 | 7/2015 | Ahiska et al. | |
| 2006/0217113 A1 * | 9/2006 | Rao | H04L 41/0233 455/422.1 |
| 2008/0052704 A1 | 2/2008 | Wysocki | |
| 2008/0297818 A1 * | 12/2008 | Shimbaru | H04N 1/6058 358/1.9 |
| 2009/0241104 A1 | 9/2009 | Amiga et al. | |
| 2010/0077475 A1 | 3/2010 | Deschenes et al. | |
| 2010/0122243 A1 * | 5/2010 | Breton | G06F 8/38 717/163 |
| 2013/0055199 A1 | 2/2013 | Kryukov et al. | |
| 2013/0165222 A1 | 6/2013 | Wysocki | |
| 2014/0115056 A1 | 4/2014 | Makower et al. | |
| 2014/0372998 A1 | 12/2014 | Salameh et al. | |
| 2015/0279055 A1 * | 10/2015 | Kaburlasos | G06T 5/002 345/587 |

* cited by examiner

*Primary Examiner* — Edward Martello
(74) *Attorney, Agent, or Firm* — Womble Bond Dickinson (US) LLP (57) ABSTRACT

Described is a system that processes texture assets for an application to be distributed across a range of devices while still leveraging device-specific hardware capabilities. In one embodiment, the system processes various criteria and determines specialized texture asset variants for a set of devices. These criteria may include various selected options including an interpretation selection for interpreting a source image for a texture, and device trait options such as device type, memory, and software support. In addition, the system may create mipmaps based on attributes of a set of target devices. Accordingly, a set of specialized texture assets may be created and distributed across a suite of devices.

23 Claims, 10 Drawing Sheets

PROVIDING VARIANTS OF TEXTURE ASSETS FOR AN ASSET CATALOG

TECHNICAL FIELD

This disclosure relates generally to the field of packaging digital assets for an asset catalog. More specifically, this disclosure relates to building specialized variants of texture assets for an application to be installed on various types of devices.

BACKGROUND

Retail software applications are typically developed or built to run across a range of devices. Accordingly, in order to lessen the development burden, such an application is often developed and packaged as a "universal version" that may be installed on a range of different types of devices. To ensure compatibility with every type of device, however, the application package may include a version of a component for each of the different types of devices.

In the context of in graphics processing, however, hardware (and even software) variances substantially alter the image processing capabilities of a device. Thus, it is often the case that applications are packaged to a lower processing capability set in order to maintain compatibility dynamics. Of course, this in turn diminishes the ability for an application to leverage the full hardware capabilities of a device. Moreover, in 3-dimensional (3D) graphics processing, data such as texture data is often not capable of being rendered without requiring specific texture loading code or custom shaders to process texture data. Accordingly, applications utilizing 3D graphics data are often not built to run across a suite of devices.

SUMMARY

In one embodiment, described is method for specializing pixel formats. The method may include receiving a selection of an interpretation option. In one embodiment, the interpretation option may be either a color information interpretation or a data information interpretation. The interpretation option may be selected from a displayed set of texture interpretation options for a texture asset to be included as part of an application. The method may also include receiving a selection of a first pixel format from a displayed set of pixel format options. In addition, the selection may also include receiving a selection, from a displayed set of target device type options, of a first device type and a second device type different than the first device type. Accordingly, based on the selected texture interpretation option, the selected pixel format option, and a set of capability attributes associated with each of the first device type and the second device type, the method may include determining the first pixel format is specialized for the first device type, and a second pixel format different than the first pixel format is specialized for the second device type. The method may then include packaging, as part of an asset catalog for the application, a first texture asset variant corresponding to the first pixel format and a second texture asset variant corresponding to the second pixel format.

In another embodiment, described is method for specializing pixel formats. The method may include receiving a selection, from a set of pixel format options for a texture asset to be included as part of an application to be installed on a set of devices, of a first pixel format, wherein the set of devices includes a first device type and a second device type. Based on a set of capability attributes associated with each of the first device type and the second device type, the method may include determining the first pixel format is not specialized for the second device type, and in response, determining a second pixel format that is specialized for the second device type and different than the first pixel format. In addition, the method may include packaging, as part of an asset catalog for the application, a first texture asset variant corresponding to the first pixel format and a second texture asset variant corresponding to the second pixel format.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments. In addition, reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

In one embodiment, described is a system that processes texture assets for an application to be distributed across a range of devices. This process may allow the texture assets to be included in an asset catalog while still leveraging device-specific hardware capabilities of potential target device. In one embodiment, the system may process various criteria and determine a specialized texture asset variant for each target device. The criteria may include various selected options including an interpretation selection for interpreting a source image for a texture. In addition, the criteria may include device trait options such as device type, memory, and software support. In one embodiment, the system may also create mipmaps based on target device attributes. Accordingly, a set of specialized texture assets may be created and efficiently distributed across a suite of devices.

As described, in one embodiment, the disclosure relates to developing and distributing application components with variants of texture assets based on various criteria. Such development and distribution may occur within a system.

Figure 1:
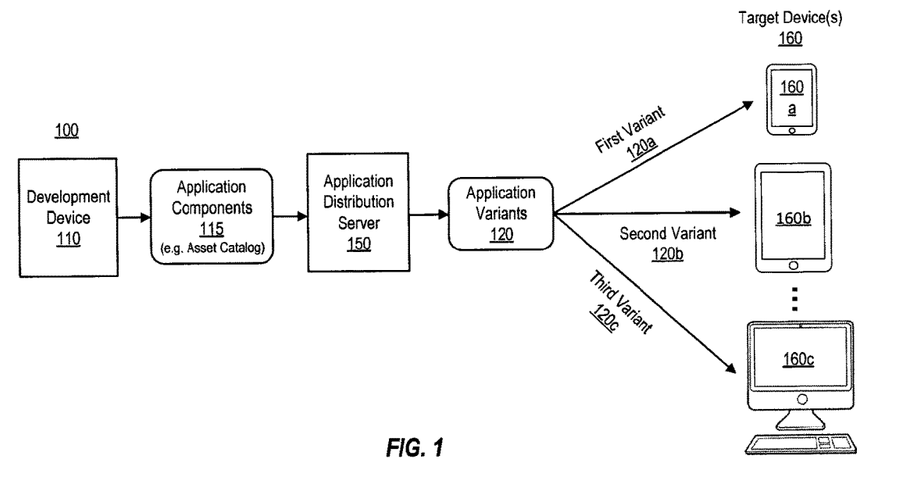
FIG. 1 is a block diagram illustrating an example system overview according an embodiment of the disclosure.

FIG. 1 is a block diagram illustrating an example system overview according to an embodiment of the disclosure. As shown, the system 100 may include a development device 110, application distribution server 150, and one or more target devices 160, all of which may be coupled via a network. The network may be any suitable type of wired or wireless network such as a local area network (LAN), a wide area network (WAN), or combination thereof. A developer (e.g. a user) may create application components 115 with, for example, the development device 110. Application components 115 may include components for installing an application on a device. For example, the components may include data in the form of executables (or intermediate code), assets (or resources) for an asset catalog, and other forms of data required for the application. The assets may include texture assets and variants, mipmaps, and other resources as discussed herein. The application package 115 may be submitted from development device 110 to application distribution server 150 via the network. The application distribution server 150 (or Application Store, or "App Store") may publish or otherwise make available the application package 115 for a user to download or install, via the network, to one or more target devices 160. It should be noted that the application distribution server 150 may be any kind of server or a cluster of servers and may include a cloud-based server, application server, backend server, or combination thereof.

When the application is to be installed on one of the target devices 160, the application distribution server 150 may create an application variant 120 customized for the particular target device 160. For example, the application variant 120 may include a particular set of components, including digital assets (e.g. texture asset variants, mipmaps, etc.), for the target device 160. The target device 160 may be one of a set of different types of devices. As referred to herein, a type of device relates to the category of device which may include, for example, a smartphone, tablet, laptop, desktop, smartwatch, VR headset, set-top-box, or any other category of devices. Accordingly, as shown in this example, a first variant 120a may be provided to target device 160a (e.g. smartphone type of device), a second variant 120b may be provided to target device 160b (e.g. tablet type of device), and a third variant 120c may be provided to target device 160c (e.g. desktop computer type of device). Accordingly, the application distribution server 150 provides a "thinned" or customized application package variant (or installation package) for each type of target device 160.

Figure 2:
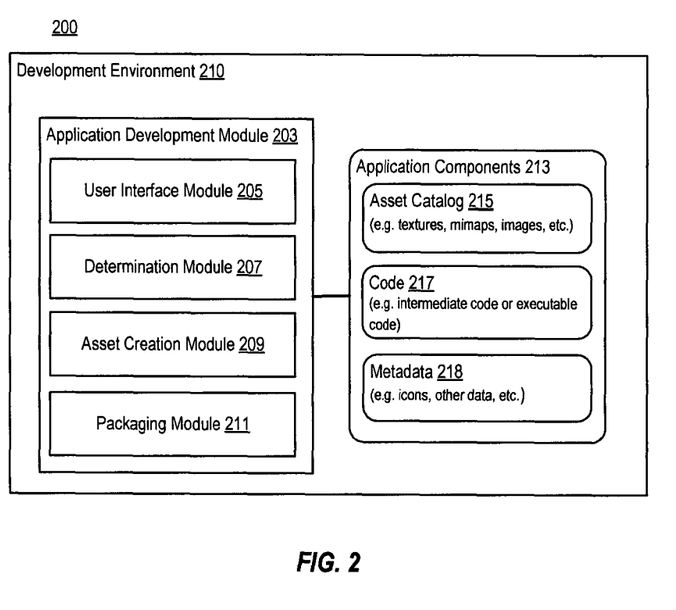
FIG. 2 is a block diagram illustrating an example development environment for creating an asset catalog according to an embodiment of the disclosure.

FIG. 2 is a block diagram illustrating an example development environment for creating an asset catalog according to an embodiment of the disclosure. In one embodiment, development device 110 may include some or all of the components of system 200 as part of a development environment 210, which may include an application development module 203 and application components 213. The application development module 203 may include a user interface module 205, a determination module 207, an asset creation module 209, and a packaging module 211. The user interface module 205 may provide a development interface allowing a developer to select various options for processing and creating assets. For example, the developer may include certain texture assets to be included as part of an application. When including texture assets as part of an application, the developer may select various options for processing which may be handled by the determination module 207 to select specialized formats. These formats may include, for example, various pixel formats or mipmap sizes. As further discussed herein, the various processing options may be selected irrespective of the intended target device as the system (e.g. determination module 207) determines various compatibility combinations and specializations. Accordingly, in an embodiment, the developer does not have to worry about compatibility issues during the development phase. Once a various formats for assets are determined, an asset creation module 209 may create the various assets (including variants) to be packaged by the packaging module 211.

The packaging module 211 may package application components 213 that may include, for example, components such as an asset catalog 215 (e.g. textures, mipmaps, images, etc.) to be accessed during runtime of the application, code 217 (e.g. executable or intermediate code) carrying different versions of machine code for different hardware of devices (e.g. processor, chip sets, etc.), and other forms of data such as metadata 218 (e.g. icons).

Figure 3:
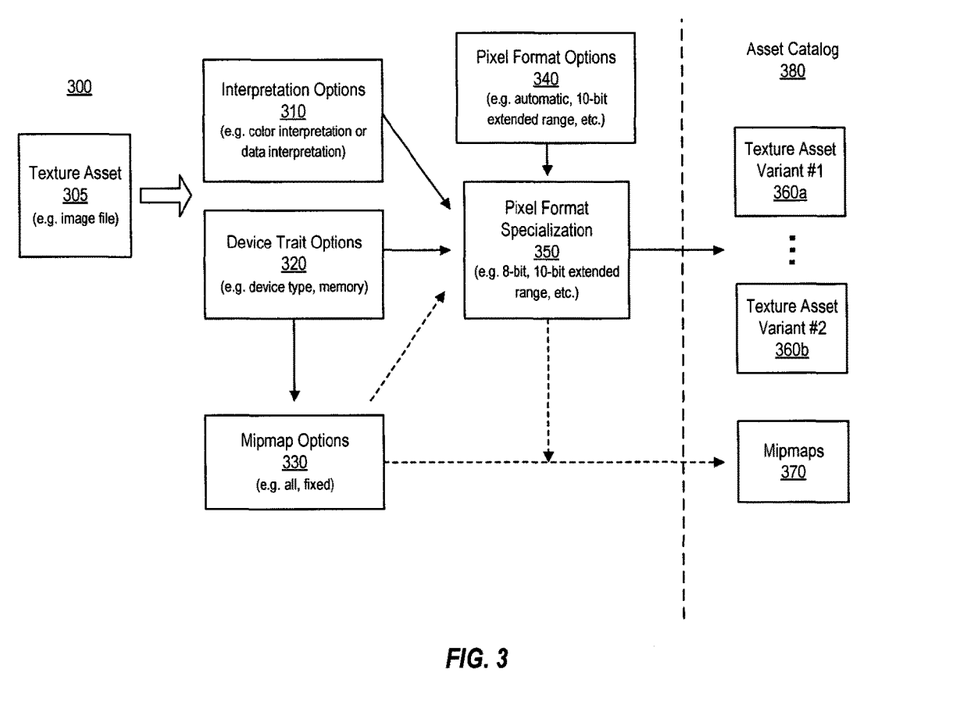
FIG. 3 is a diagram illustrating an example workflow for processing texture assets for an asset catalog according to an embodiment of the disclosure.

FIG. 3 is a diagram illustrating an example workflow for processing texture assets for an asset catalog according to an embodiment of the disclosure. The process 300 may be performed by a system (or device, e.g. development device 110). The process 300 may start with a texture asset 305. In this example, the texture asset 305 is shown as an image file, but other types of texture file formats are also contemplated. As referred to herein, an image file is defined broadly to include any type of texture format (e.g. bmp, jpeg, jpg, tga, bpm, pgm, png, ppm, psd, tiff, raw, etc.) that may be used in any number of applications including 2D and 3D image or graphics processing. When the texture asset 305 is to be included in an application, a developer, for example, may choose to create a texture (or texture set) within the development environment. In one embodiment, the texture asset 305 may include a cube texture (or set). A cube texture, for example, may use the six faces of a cube as six square textures, or may be unfolded into six regions of a single texture as the map shape. Such a mapping may include projecting the map onto the sides of a cube, and accordingly, a cube texture may be a more efficient for wrapping certain 3D polygonal objects or shapes.

Figure 4:
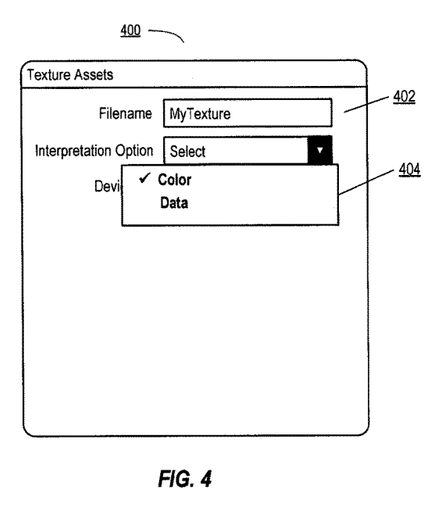
FIG. 4 is an example interface component for selecting a color or data interpretation option according to an embodiment of the disclosure.

In one embodiment, the developer may choose how the texture is to be interpreted by the system. Accordingly, a developer may be provided with a set of texture interpretation options 310. Providing such an option allows the system to more accurately process and interpret the source data. In one embodiment, the texture interpretation options may include a color interpretation, or a data interpretation. FIG. 4 is an example interface component for selecting a color or data interpretation option according to an embodiment of the disclosure. As shown, the interface 400 may include a set of interpretation options 404 for source image 402 ("MyTexture"). In the embodiment shown, the interpretation option may be either a color interpretation or a data interpretation. For example, a color interpretation may indicate the source image 402 represents an image such as a photograph or illustration to be wrapped on an object (e.g. 3D polygonal object). A data interpretation on the other hand may indicate the source image 402 represents, for example, generic data to be fed to a graphics processing unit (GPU) shader.

The color versus data interpretation dynamic provides the additional advantage of allowing a developer to specify the conversion formula and pixel format best suited for the use case. For example, under a color interpretation, the system may perform the conversion with respect to enhancing (or maximizing) visual output quality. For instance, under the color interpretation, the system may "color match" to the sRGB profile, and accordingly, choose a corresponding sRGB pixel format, which is more appropriately suited to express color information. In contrast, if the developer chooses the data interpretation, the system may perform the conversion with respect to maximizing the source values in order maintain accuracy of texture data. For example, under the data interpretation, the system may select the most accurate pixel format to express the source data.

In one embodiment, the system may also perform alpha premultiplication under a color interpretation. For example, if there is transparency in the source asset (e.g. 50% faded color), the system may pre-multiply the RGB color components by (e.g. 0.5) to provide a color representation that is more specialized, for example, with GPU blending.

Figure 5:
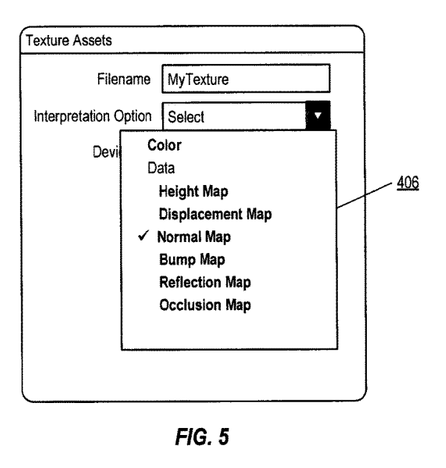
FIG. 5 is an example interface component for selecting an interpretation option including specific data type interpretations according to an embodiment of the disclosure.

In another embodiment, additional interpretation options may be available including specifying with more the interpretation with greater specificity. For example, a data interpretation may be specified with respect to a particular data types. FIG. 5 is an example interface component for selecting an interpretation option including specific data type interpretations according to an embodiment of the disclosure. As shown, specific data type interpretations 406 may be selected to provide the system the ability to even more potentially accurate processing. As shown, the data types may include a height map, displacement map, normal map, bump map, reflection map, occlusion map, or any other types of maps or data. For example, it is contemplated that the system more process additional forms a data that may be used, for example, in multi-pass rendering and or other complex mapping scenarios.

Returning to FIG. 3, the system may include additional options that may be selected by the developer when processing a texture asset such as device trait options 320. In one embodiment, the device trait options 320 may include specifying target device types. Accordingly, the system allows a developer to target an application for particular devices, or all of the devices within a suite of devices.

Figure 6:
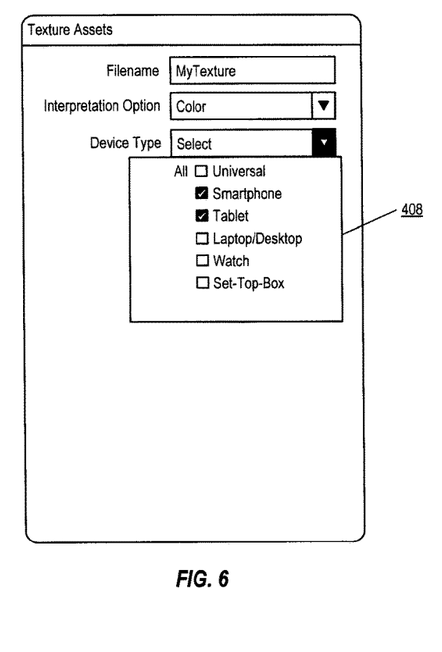
FIG. 6 is an example interface for selecting target device types for a texture asset according to an embodiment of the disclosure.

FIG. 6 is an example interface for selecting target device types for a texture asset according to an embodiment of the disclosure. As shown, the interface includes a set of device types 408 that may be selected as target device types by a developer. As shown, the interface may include an option to select specific device types, as well as an option to select all device types (e.g. "universal" or similar option). The set of device types 408 included in the interface may correspond to groups of devices available within a suite of devices and may be categorized (or grouped) based on capabilities. For example, an application may be specifically developed for portable devices rather than a desktop or laptop computer. In such a situation, as shown in this example, a developer may select a smartphone and tablet as the target device types for the application. As described, the developer may be free to choose any device type, and as discussed further herein, appropriate texture variants will be selected automatically by the system.

Figure 7:
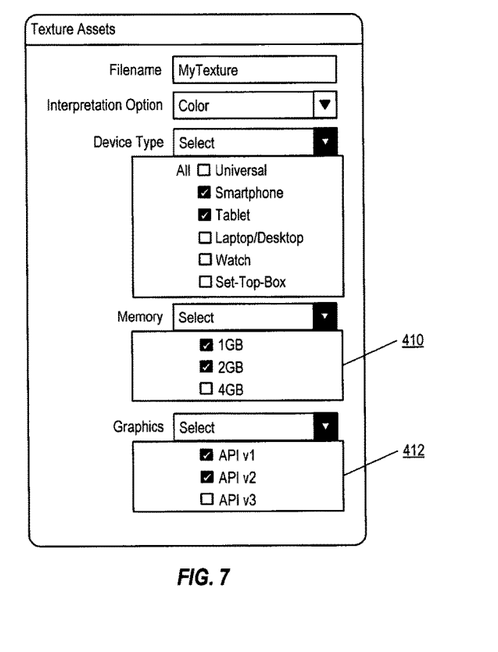
FIG. 7 is an example interface for selecting additional device traits according to an embodiment of the disclosure.

In one embodiment, additional device traits may also be included as capabilities for a target device. FIG. 7 is an example interface for selecting additional device traits according to an embodiment of the disclosure. As shown, the additional device traits may include memory attributes 410. For example, rendering and processing of certain textures may be memory intensive, and accordingly, a developer may limit particular assets to devices with sufficient memory capacity. In addition, the device traits may include graphics traits 412, which may be related to hardware capabilities (e.g. GPU) or software capabilities (e.g. application programming interface (API)). As shown in this example, the graphics traits 412 may relate to software attributes, although these may indirectly relate to hardware capabilities (e.g. a certain GPU capability is required for a certain API version). For example, a hardware-accelerated compression format may require an appropriate API is installed on the target device for rendering 2D or 3D graphics.

Accordingly, in one embodiment, a developer may select a particular set of target API versions for a texture asset. This selection allows a developer (or the system) to specify a particular rendering ability. For example, a GPU (e.g. supporting hardware-accelerated decompression of assets) may not be compatible with certain APIs. In another example, a particular API (or a certain version, libraries, extension pack, etc.) may need to be installed on the device for rendering a particular asset (e.g. ASTC format). As referred to herein, and unless otherwise stated, an application programming interfaces (API) is defined broadly to include any set, or packages, of frameworks, protocols, routines, interfaces, libraries, data structures, object classes, etc. that may be used for interacting with software or hardware components of a device. For example, in some embodiments, an API may relate to rendering 2D and 3D graphics based on, for example, Open GL, Open GL ES, Vulkan, Metal, Direct 3D, Mantle, Renderman, or any other API. APIs may also include any other current and future developed APIs from various standards group including, for example, the Khronos Group.

It should be noted that more options may also be provided within the interface. For example, any additional attributes may be selectable within the interface. For example, processor, battery, display screen size, gamut, or resolution, etc., may also be available to be selected as options by a developer (including options to include "all" types). It is also contemplated that new types of devices (e.g. a device added to a suite of devices or ecosystem of a provider) may also be incorporated into the system by simply adding the new device into, for example, mapping tables.

Returning to FIG. 3, the system may determine a pixel format specialization 350 for the target devices based on options selected (e.g. interpretation options 310 and/or device trait options 320). In one embodiment, the pixel format specialization 350 may select a specialized (or enhanced) pixel format for each of the target devices (and selected device traits). In one embodiment, the developer may also select pixel format options 340 that may be included in the specialization process. For example, in one embodiment, if a developer chooses a pixel format not renderable by each target device, the specialization will include an alternate specialized pixel format (or fallback pixel format). In another embodiment, the pixel format specialization may automatically select specialized pixel formats for each of the set of target devices in response to an "automatic" selection.

Figure 8:
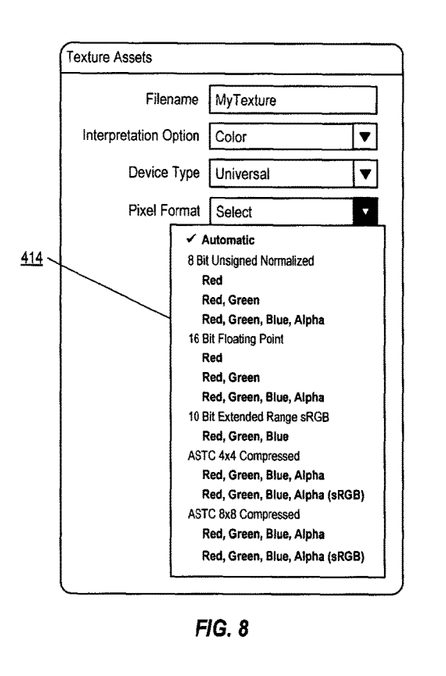
FIG. 8 is an example interface for selecting pixel formats according to an embodiment of the disclosure.

FIG. 8 is an example interface for selecting pixel formats according to an embodiment of the disclosure. As shown, a developer may select a format from a set of pixel formats 414. In addition, a particular set of these pixel formats 414 may be selected when providing specialized texture asset variants for a target device. As described, the system may select an appropriate pixel format based on an interpretation option and particular device traits. In addition, particular device types may be associated with capability attributes which are used in the determination process. In other words, the system may provide formats based on explicit selections by a developer, and may provide alternate or automatic selections based on a determination process. As one illustrative example, a first target device type may support fast random access reads of an ASTC 4×4 texture compression. A second target device, however, may not support such a feature, and instead, supports random access reads from an uncompressed 8 bit unsigned normalized red, green, blue, alpha pixel format. ASTC (or other compressed format) is an efficient texture format for the first device, and therefore remains available to the first device. However, the system may include the uncompressed format as an alternative or fallback in addition to the compresses format. Thus, the system ensures that the texture is not only renderable on all devices, but selects an efficient format for the application. Accordingly, in one embodiment, the selection process includes specialization determination to select pixel formats.

In another illustrative example, the first device may have a wide gamut display, while a second device has a standard gamut display. Both of these devices may support an "extended range" pixel format, that can express wide gamut colors, but such formats are often memory intensive. Accordingly to take advantage of the wider gamut display of the first device, the system may select the extended range pixel format. The system may also select a standard pixel format for the second device to conserve memory.

It should be noted that the "automatic" selection may be predefined or may be established based on a set of criteria. In one embodiment, the set of criteria may ensure the pixel format conforms to a particular standard (e.g. image quality, performance, size, etc.). For example, an automatic pixel format option may be defined based on maintaining an image quality standard throughout a suit of device types (e.g. devices within an ecosystem).

Figure 9:
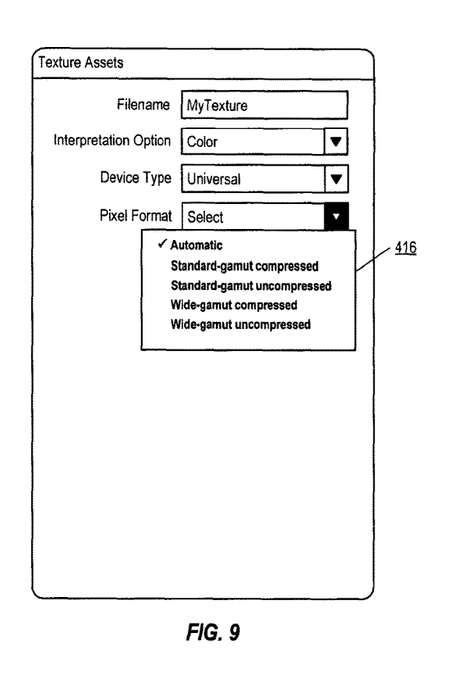
FIG. 9 is an example interface for selecting intent-based pixel formats according to an embodiment of the disclosure.

In an embodiment, the format options may be described (e.g. listed) in a device agnostic manner. For example, the options may include intent-based options instead of capability-based options. FIG. 9 is an example interface for selecting intent-based pixel formats according to an embodiment of the disclosure. As shown, the pixel format options 416 may be listed in general terms without reference to the devices. This allows a developer to freely choose any option without the concern of whether the option is compatible or supported by each type of device. For example, in addition to an automatic selection, the system may provide a "standard-gamut" or "wide-gamut" options each of which may be selected as "compressed" or "uncompressed." Although developers may generally know which types of devices are capable of certain display capabilities, a developer need not be burdened with such issues, as further discussed herein, an alternative (or additional, or backstop, or fallback) formats may be included.

It should be noted that the format options are examples on generic naming conventions, but other naming conventions with similar or different results are also contemplated. For example, "highest" quality, for example, would be synonymous with "best" quality and generally refer to the intent of maintaining a highest degree of image quality.

Returning once again to FIG. 3, once a set a specialized pixel formats is determined, the system may create a set of texture assets variants 360*a-b*. In one embodiment, these variants may be included as part of an application catalog 380. In one embodiment, the system may also include a set of mipmap options 330. In one embodiment, mipmaps options 330 may be selected based on device trait options 320. For example, based on a display capability of a target device, the base mipmap level may be selected. In one embodiment, the system may omit (or skip) a base mipmap level and start with a smaller mipmap level, for example, to target devices with a smaller display screen. For example, if the texture asset is 1000 pixels wide by 2000 pixels high and a developer sets mipmap generation to "all," this would typically include a base mipmap of 500 pixel wide by 1000 pixels high, followed by 250 pixels wide by 500 pixels high, 125 pixels wide by 250 pixel high, and so on. Accordingly, in one embodiment, if the texture is to be used on a device that is memory constrained, a base mipmap level starting from 250 pixels wide by 500 pixels high may be used.

In one embodiment, the system may adjust the size of the texture without using mipmaps. For example, based on certain device traits, the texture can be resized to conserve memory (e.g. a 10,000×20,000 pixel texture may be reduced to 1,000×2,000 pixel texture). This reduction may be done in various ways including percentage-based calculations (e.g. reduce to 1% of memory using the example above).

Figure 10:
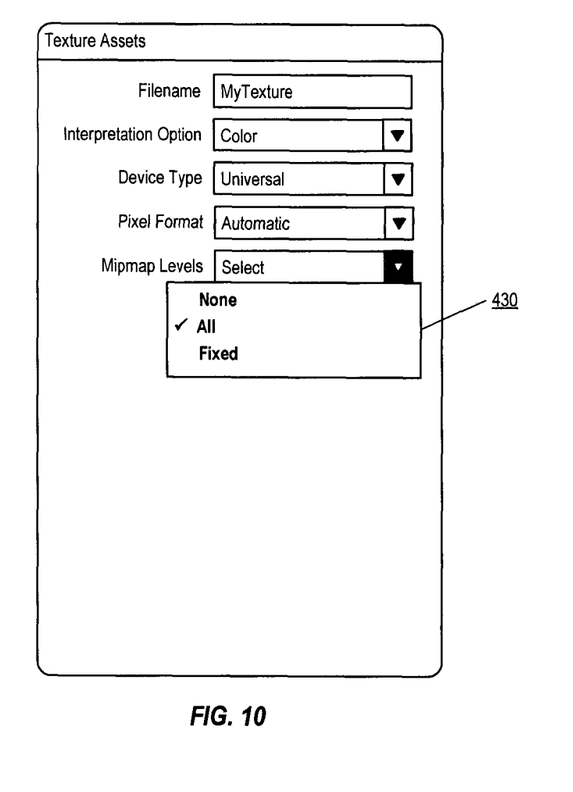
FIG. 10 is an example interface for selecting mipmap options according to an embodiment of the disclosure.

The system may create mipmaps 370 according to the mipmap options 320. In embodiment, the system create mipmaps 370 directly for the asset catalog 380. In another embodiment, mipmap options 330 may be provided in conjunction with the pixel format specialization 350 process to generate mipmaps 370 based on interpretation options 310 and/or device trait options 320. FIG. 10 is an example interface for selecting mipmap options according to an embodiment of the disclosure. As shown, the mipmap options 430, in this embodiment, may include "none," "all," or "fixed." For example, if a developer selects "all" the system may generate data by down sampling a source image for each mipmap level. In one embodiment, the down sampling may occur when the application is built. In another example, when the developer selects "fixed," the developer may specify certain mipmap levels, and accordingly, the system will generate mipmaps for any levels not specified by downsampling the next largest level.

It should be noted that in the examples above, the interface may disable the selection of certain options in response to selected combinations of options (e.g. certain pixel format options may be disabled in response to a selected device type). Regardless of the specific implementation of the interface, the system, in one embodiment, relieves the developer from determining the compatibility between options. In addition, although various options are shown as being selected via an interface, other forms of selection are also complemented such, for example, through a command line instruction or through a programming protocol (e.g. via an API).

Figure 11:
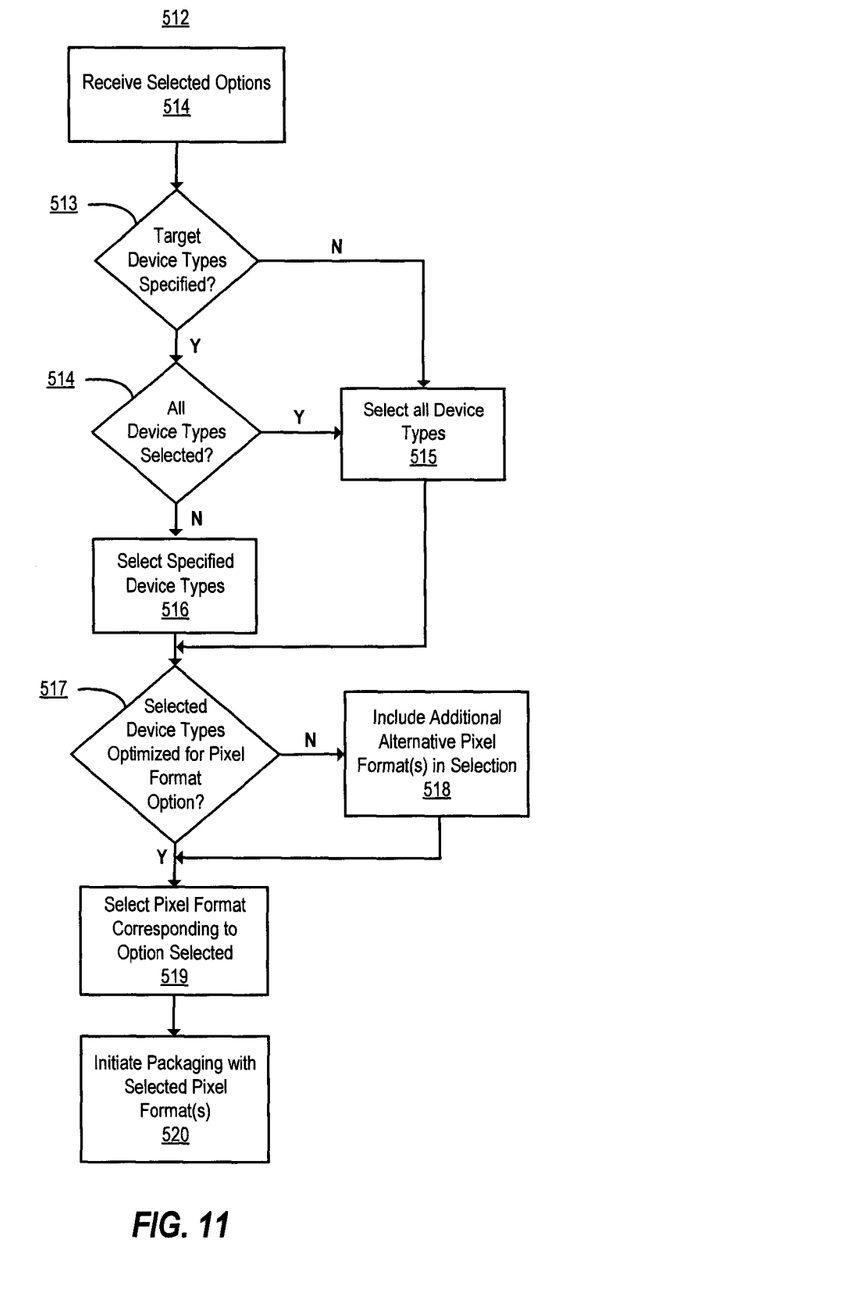
FIG. 11 is an example flowchart for selecting a pixel format for a set of target devices according to an embodiment of the disclosure.

FIG. 11 is an example flowchart for selecting a pixel format for a set of target devices according to an embodiment of the disclosure. The process 512 may begin by the system receiving a set of options in 513 (e.g. interpretation options 310 and device trait options 320). As described above, target device types may be specified in 513. However, if no target device types are specified, or if target device types are specified in 513, and the selection includes all device types in 514, the system may select all device types in 515. Alternatively, if all device types are not selected in 514 (e.g. specific device types are selected as shown, for example, in FIG. 7), the system may proceed with the specified device types in 516. In 517, the system determines whether the selected device types are specialized for the selected pixel formats (e.g. specialization of 350). In 518, if the selected pixel format is not specialized for the selected device types, the system may include one or more additional alternate pixel formats in the selection. Again, this ensures that the texture asset is renderable in some form by all of the device types, and in one embodiment, specialized for each device type. For example, if a developer selects a pixel format that is not supported by every device type (e.g. an option corresponding to a hardware-accelerated compression format), an alternative pixel format may be additionally selected (e.g. a non-hardware accelerated option).

If the selected device type is in fact compatible with the selected pixel format option in 517, the system, in 519, may continue and select only the pixel format corresponding to the option selected in 519. Accordingly, an in embodiment, the system may initiate compression in 520 using only the pixel format corresponding to the option selected, or the pixel formats corresponding to the option selected and one or more alternate compression formats. In some embodiments, when determining which pixel format to select, the system may refer to a list of device trait attributes of the set of target devices.

It should be noted that selections deemed "efficient" or "specialized" may vary or be adjusted based on various criteria. It is not contemplated to be referred to in a limiting sense or to imply that only the most optimal selection (although that will often be the case) will be provided.

Figure 12:
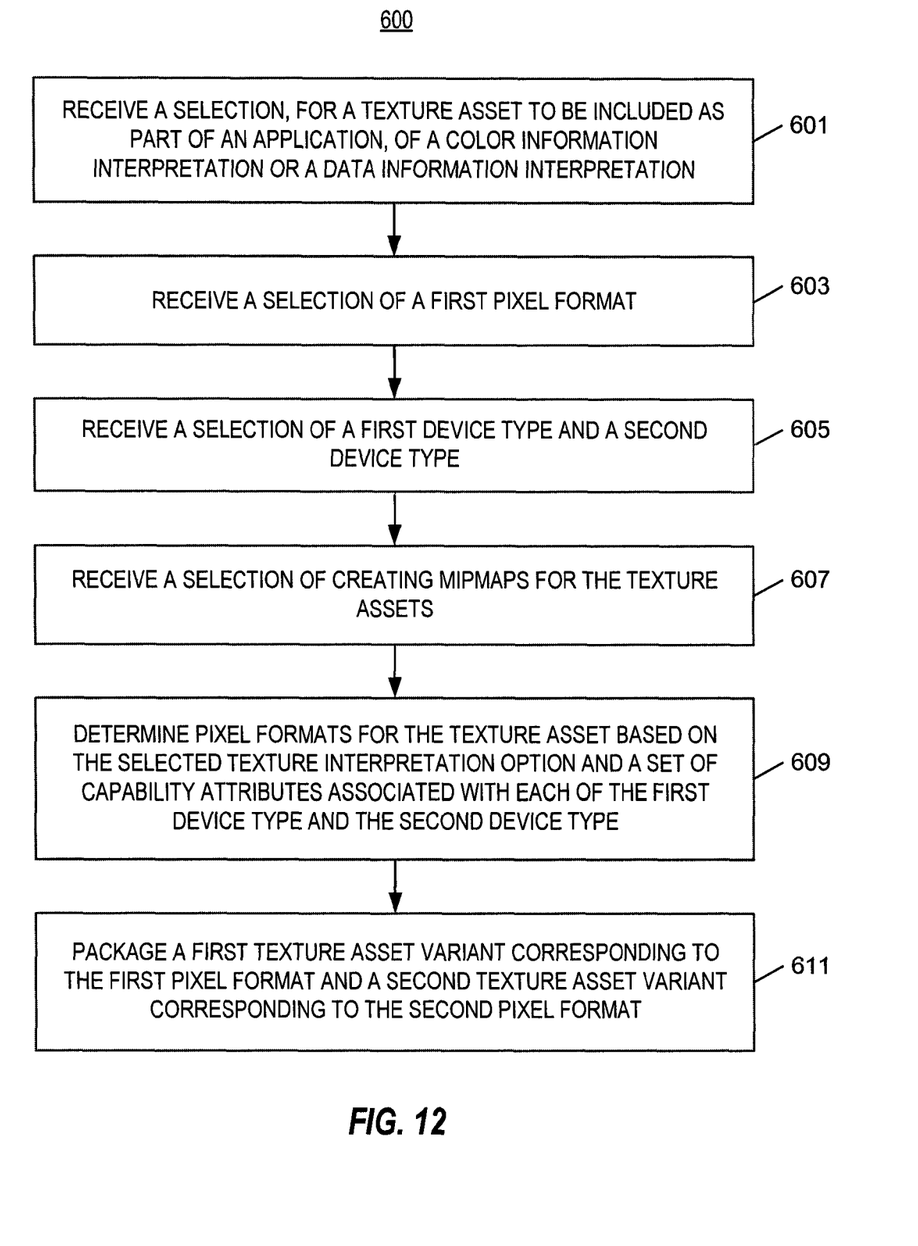
FIG. 12 is an example flow diagram illustrating a method of processing texture assets according to an embodiment of the disclosure.

FIG. 12 is an example flow diagram illustrating a method of processing texture assets according to an embodiment of the disclosure. Process 600 may use processing logic which may include software, hardware, or a combination thereof. For example, process 600 may be performed by a system (or device, e.g. development device 110). In 601, the system may select either a color information interpretation or a data information interpretation for a texture asset to be included as part of an application. In 603, the system may also select, from a displayed set of pixel format options for the texture asset, a first pixel format. In 605, the system may also select, from a displayed set of target device type options for the application, a first device type and a second device type different than the first device type. In 609, the system may determine the first pixel format is specialized for the first device type, and a second pixel format different than the first pixel format is specialized for the second device type. The determination may be based on the selected texture interpretation option, the selected pixel format option, and a set of capability attributes associated with each of the first device type and the second device type. In one embodiment, the system may also, in 611, package, as part of an asset catalog for the application, a first texture asset variant corresponding to the first pixel format and a second texture asset variant corresponding to the second pixel format.

In one embodiment, when building an application, system may optimize the memory layout of the texture data for each device "offline" (e.g. before the application is installed on a target device). For example, devices may accept a non-linear (e.g. tiled, pixel twiddled, or pixel swizzled) memory layout. Using such a layout, the system may improve cache coherency for the pattern of pixel/fragment shader execution of that device. Typically, computations to determine a preferred memory layout for the device is done on the device when the texture is first used at application run time. In one embodiment, the system may perform this computation at build time or any time offline based on the selected target devices. Accordingly, when the application loads the texture, the device may be processes the texture faster and with less power.

As described above, in one embodiment, the system provides a scalable system for managing assets. For example, the system may dynamically generate new specializations of a texture given the traits of any new devices. For example, the system may create new specializations of a texture from the source asset when a newer device which support a new set of pixel formats, have new memory constraints, or have new displays with different color gamut are introduced.

It should be noted that there may be variations to the flow diagrams or the steps (or operations) described therein without departing from the embodiments described herein. For instance, the steps may be performed in parallel, simultaneously, a differing order, or steps may be added, deleted, or modified.

Figure 13:
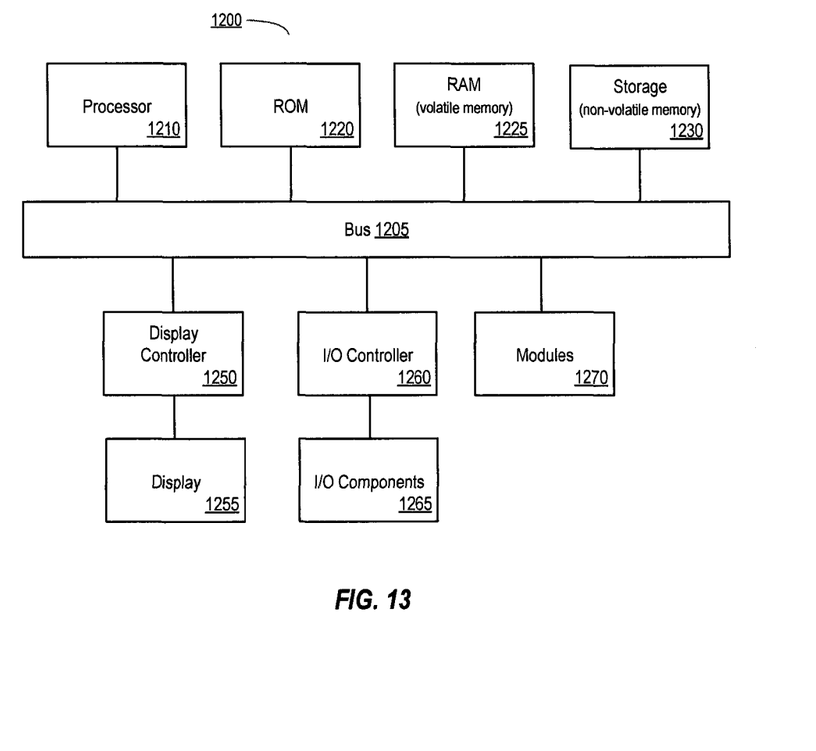
FIG. 13 is a block diagram illustrating an example computing system which may be used in conjunction with one or more of the embodiments of the disclosure.

FIG. 13 is a block diagram illustrating an example computing system which may be used in conjunction with one or more of the embodiments of the disclosure. For example, computing system 1200 (or system, or computing device, or device) may represent any of the systems (e.g. systems 200 and 300), or devices described herein (e.g. development device 110 or application distribution server 150) that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor 1210 may retrieve stored instructions from one or more of the memories 1220, 1225, and 1230 and execute the instructions to perform processes, operations, or methods described herein. These memories represent examples of a non-transitory machine-readable medium or storage containing instructions which when executed by a computing system (or a processor), cause the computing system (or processor) to perform operations, processes, or methods described herein. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Modules 1270 (or components, units, or logic) may represent any of the modules described above, such as, for example, application development module 203 (and related modules, and sub-modules). Modules 1270 may reside, completely or at least partially, within the memories described above, or within a processor during execution thereof by the computing system. In addition, modules 1270 can be implemented as software, firmware, or functional circuitry within the computing system, or as combinations thereof.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory machine-readable medium storing instructions which, when executed by one or more processors of a computing device, cause the computing device to perform operations that provide different variants of a texture asset to different target device types, the operations comprising:
   receiving a selection, from a displayed set of texture interpretation options for a texture asset to be included as part of an application that inform a target device how the texture asset is to be interpreted, of either a color information interpretation, indicating to the target device that the texture asset is to be processed as a color image, or a data information interpretation, indicating to the target device that the texture asset is to be processed as image data;
   receiving a selection, from a displayed set of pixel format options, of a first pixel format, each pixel format option indicating a representation format for pixels in a texture asset;
   receiving a selection, from a displayed set of target device type options, of a first device type and a second device type different than the first device type;
   based on the selected texture interpretation option, the selected pixel format option, and a set of capability attributes indicating capabilities of a device type that are associated with rendering texture assets, the set of capability attributes associated with each of the first device type and the second device type, determining the first pixel format is not specialized for the second device type, and in response, determining a second pixel format different than the first pixel format and the second format is specialized for the second device type;
   generating a first texture asset variant for the first device type and generating a second texture asset variant for the second device type; and
   packaging, as part of an asset catalog for the application, the first texture asset variant corresponding to the first pixel format and the second texture asset variant corresponding to the second pixel format, both the first texture asset variant and the second texture asset variant packaged in the asset catalog in association with the texture asset, wherein the packaging further includes code to be accessed by an application that will render at least one of the first or second texture asset variants.

2. The medium of claim 1, wherein the selected texture interpretation option is the color information interpretation, the first pixel format is a standard color gamut, and the determining includes determining the second pixel format is a wide color gamut based on a color display capability attribute associated with the second device type.

3. The medium of claim 1, wherein the first pixel format corresponds to a hardware-accelerated pixel format and the second pixel format corresponds to a non-hardware-accelerated pixel format.

4. The medium of claim 1, the operations further comprising receiving a selection of an option for creating mipmaps for the texture asset.

5. The medium of claim 4, wherein the set of capability attributes associated with each of the first device type and the second device type include a memory attribute, and the operations further comprising:
   determining a set of mipmaps based on the memory attribute of the first device type or the second device type; and
   creating, for the asset catalog, the set of mipmaps, wherein the set of mipmaps includes a smaller base mipmap based on the memory attribute indicating a memory constraint for the first device type or the second device type.

6. The medium of claim 1, the operations further comprising receiving a selection, from a displayed set of device trait attributes, of one or more attributes for the set of capability attributes.

7. The medium of claim 6, wherein the capability attributes include a memory capacity for the selected device types.

8. The medium of claim 6, wherein the capability attributes include an installed software component for the selected device types.

9. The medium of claim 1, wherein the displayed set of texture interpretation options includes a set of data types as part of the data information interpretation.

10. The medium of claim 9, wherein the displayed set of data types includes at least one of a height map, displacement map, normal map, bump map, reflection map, and occlusion map.

11. The medium of claim 1, wherein the displayed set of pixel format options includes a set of device agnostic intent-based options.

12. A non-transitory machine-readable medium storing instructions which, when executed by one or more processors of a computing device, cause the computing device to perform operations that provide different variants of a texture asset to different target device types, the operations comprising:
   receiving a selection, from a displayed set of texture interpretation options for a texture asset to be included as part of an application that inform a target device how the texture asset is to be interpreted, of either a color information interpretation, indicating to the target device that the texture asset is to be processed as a color image, or a data information interpretation, indicating to the target device that the texture asset is to be processed as image data;
   receiving a selection, from a set of pixel format options for a texture asset to be included as part of an application to be installed on a set of devices, of a first pixel format, wherein the set of devices includes a first device type and a second device type, each pixel format option indicating a representation format for pixels in the texture asset;

based on the selected texture interpretation option, the selected pixel format option, and a set of capability attributes associated with each of the first device type and the second device type, the set of capability attributes indicating capabilities of a device type that are associated with rendering texture assets, determining the first pixel format is not specialized for the second device type, and in response, determining a second pixel format that is specialized for the second device type, wherein the second pixel format is different than the first pixel format:, generating a first texture asset variant for the first device type and generating a second texture asset variant for the second device type; and packaging, as part of an asset catalog for the application, the first texture asset variant corresponding to the first pixel format and the second texture asset variant corresponding to the second pixel format, both the first texture asset variant and the second texture asset variant packaged in the asset catalog in association with the texture asset, wherein the packaging further includes code to be accessed by an application that will render at least one of the first or second texture asset variants.

13. The medium of claim 12, the operations further comprising receiving a selection, from a displayed set of texture interpretation options for a texture asset to be included as part of an application, of either a color information interpretation or a data information interpretation.

14. The medium of claim 12, wherein the first device type and the second device type are selected from a set of target device type options for the application displayed on a user interface.

15. The medium of claim 12, further comprising:
determining that the second pixel format is compatible with the second device type, before generating the second texture asset variant for the second device type.

16. The medium of claim 12, the operations further comprising:
receiving a selection of an option for creating mipmaps for the texture asset
determining a set of mipmaps based on a capability attribute associated with the first device type or the second device type; and
creating, for the asset catalog for the application, the set of mipmaps.

17. The medium of claim 16, wherein the set of mipmaps includes a smaller base level based on the capability attribute indicating a memory constraint for the first device type or second device type.

18. A computer-implemented method that provides different variants of a texture asset to different target device types, the method comprising:
receiving a selection, from a displayed set of texture interpretation options for a texture asset to be included as part of an application that inform a target device how the texture asset is to be interpreted, of either a color information interpretation, indicating to the target device that the texture asset is to be processed as a color image, or a data information interpretation, indicating to the target device that the texture asset is to be processed as image data;

receiving a selection, from a displayed set of pixel format options for the texture asset, of a first pixel format option indicating a representation format for pixels in the texture asset;

receiving a selection, from a displayed set of target device type options for the application, of a first device type and a second device type different than the first device type;

based on the selected texture interpretation option, the selected pixel format option, and a set of capability attributes indicating capabilities of a device type that are associated with rendering texture assets, the set of capability attributes associated with each of the first device type and the second device type, determining the first pixel format is not specialized for the second device type, and in response, determining a second pixel format that is specialized from the second device type, generating a first texture asset variant for the first device type, and generating a second texture asset variant for the second device type, wherein the second pixel format is different than the first pixel format; and packaging, as part of an asset catalog for the application, the first texture asset variant corresponding to the first pixel format and the second texture asset variant corresponding to the second pixel format, both the first texture asset variant and the second texture asset variant packaged in the asset catalog in association with the texture asset, wherein the packaging further includes code to be accessed by an application that will render at least one of the first or second texture asset variants.

19. The method of claim 18, wherein the image source interpretation is a color information interpretation or a data information interpretation.

20. The method of claim 18, wherein the displayed set of texture interpretation options includes a set of data types including at least one of a height map, displacement map, normal map, bump map, reflection map, and occlusion map.

21. The method of claim 18, wherein the code comprises executable code or intermediate code to be accessed to render at least one of the first or second texture asset variants.

22. The method of claim 18, wherein the selected texture interpretation option is a color image interpretation, and the texture asset is interpreted by a target device as one of:
a color image to be wrapped on a three dimensional (3D) object; or
a color image that is to be pre-multiplied by RGB color components by a factor to perform image blending.

23. The method of claim 18, wherein the selected texture interpretation object is an image data interpretation, and the image data is to be interpreted by a target device as one of:
a source image comprising data that is to be fed to a graphics processing unit; or
image data that specifies a data type, including one of: a height map, a displacement map, a reflection map, or an occulsion map.

* * * * *